Feb. 8, 1955     E. LIPMAN     2,701,737

DIAPHRAGM TYPE ATOMIZER

Filed May 5, 1954

INVENTOR.
ELMER LIPMAN.
BY
Samuel Wiseman
ATTORNEY

United States Patent Office 2,701,737
Patented Feb. 8, 1955

2,701,737

DIAPHRAGM TYPE ATOMIZER

Elmer Lipman, Detroit, Mich.

Application May 5, 1954, Serial No. 427,758

8 Claims. (Cl. 299—88)

The present invention pertains to a novel atomizer for various liquids and particularly those in the category of cosmetics.

Such atomizers are ordinarily rendered intricate and expensive by the necessary provision of two check valves for control of air flow and the discharge of liquid at proper times in the cycle of operation. The principal object of this invention is to provide a considerably simpler and less expensive construction by the elimination of the check valves, although air is compressed for the discharge of liquid.

In the accomplishment of this object there is provided a tubular fitting with a partition between its ends. The partition has an aperture therethrough for flow of liquid to its upper surface from the receptacle.

The pumping and discharge of liquid from the top of the partition is effected by means of a diaphragm laid on the partition. More particularly, the diaphragm has a lip that extends into a recess formed in the partition and from which the discharge port extends. An air compressing device actuates the diaphragm and causes vibration of the lip which in turn breaks up the liquid before it is discharged through the port.

Figure 1:
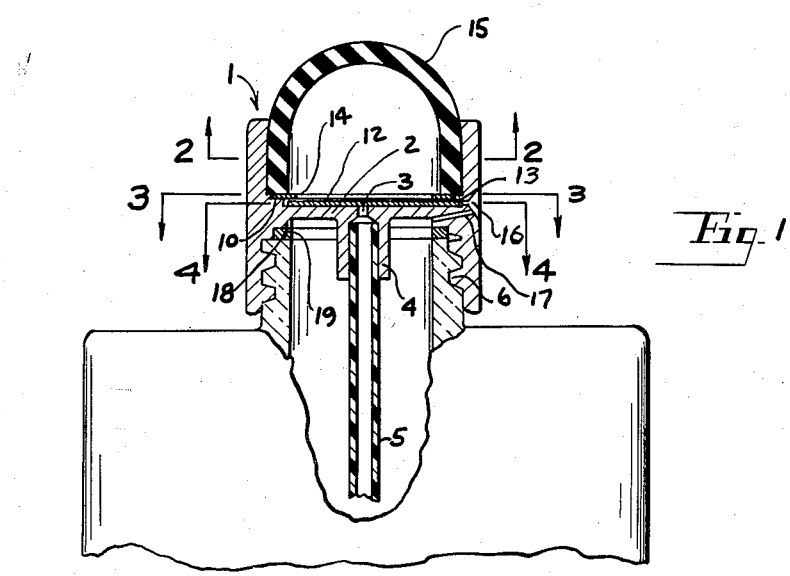
Figures 2, 3:
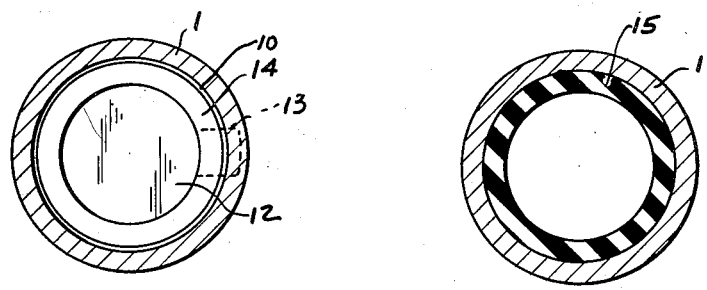
Figure 4:
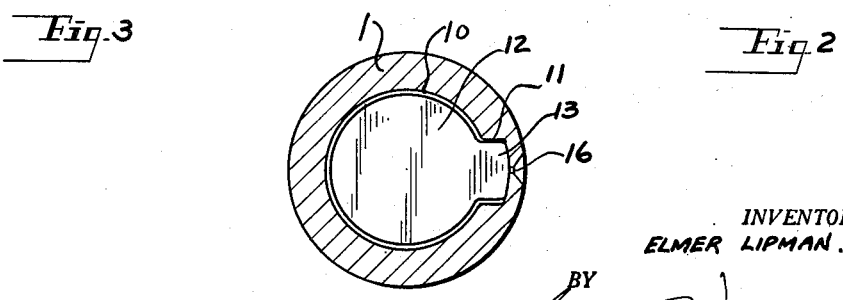

The invention is fully disclosed by way of example in the following description and in the accompanying drawings in which Figure 1 is a vertical section of the atomizer;
Figure 2 is a section on the line 2—2 of Figure 1;
Figure 3 is a section on the line 3—3 of Figure 1, and
Figure 4 is a section on the line 4—4 of Figure 1.

Reference to these views will now be made by use of like characters which are employed to designate corresponding parts throughout.

In Figure 1 is shown a tubular fitting 1 having an internal partition 2 between its ends. Preferably in the center of the partition is formed an aperture 3, and a nipple 4 extends downward from the aperture to receive the small tube 5 extending into the liquid contents of a receptacle as known in the art. Below the partition, the interior of the fitting is formed with threads 6 to be screwed on the neck of the receptacle in the usual manner.

On the upper surface of the partition 2 is formed a surrounding ridge 10 having a recess or pocket 11 across its upper surface. On the partition, within the ridge is laid a thin flexible diaphragm 12, preferably of metal, formed with a lip 13 that enters the recess 11 with sufficient play to vibrate therein. On the ridge 10 is laid a washer 14 which overlaps the diaphragm as shown. In this position the washer is preferably loose in the fitting and is assembled to leave a portion of the lip 13 uncovered for easier vibration in the manner presently to be described. Finally, a compressible cap or bulb 15 is inserted in the upper end of the fitting to bear on the washer 14.

Through the wall of the fitting is formed a fine discharge port 16 having its end lying at the tip of the lip 13. The diameter of this port is preferably equal to the thickness of the diaphragm 12. A vent passage 17 extends through the wall of the fitting inward to a certain point below the partition 2 where it is unobstructed.

The partition 2 is preferably formed on its lower surface with a peripheral ridge 18 constituting a seat for a sealing ring or gasket 19 bearing on the upper end of the neck of the receptacle to which the fitting is applied.

In the operation of the device, the cap 15 is compressed a few times in rapid succession. On the relief or expansion stroke, the diaphragm 12 will be raised, and liquid will be drawn to the upper surface of the partition 2. The ridge is preferably thicker than the diaphragm to permit this movement. On the pressure stroke, this liquid will be pushed beneath the lip 13 and into the recess 11, at least after the diaphragm has closed the aperture 3. From the recess, the trapped liquid is forced through the discharge port 16 from which it is sprayed by reason of the fineness of the port. The cap 15 is sufficiently tight against the inner wall of the fitting to prevent leakage of liquid through the top of the fitting. Venting for expansion of the cap is accomplished by inward flow of air through the port 16 and around the diaphragm.

The repeated contraction and expansion of cap 15 causes a vibration of the diaphragm, or at least the lip 13 thereof, at a considerably higher frequency. This action of the lip breaks up the liquid in the recess beneath into fine particles which become a spray as they are passed through and discharged from the port 16.

It will now be seen that the invention provides an extremely simple and inexpensive apparatus that does away with the usual two check valves ordinarily necessary in hand atomizers.

Although a specific embodiment of the invention has been illustrated and described, it will be understood that various alterations in the details of construction will be made without departing from the scope of the invention as indicated by the appended claims.

What I claim is:

1. An atomizer comprising a tubular fitting, a partition between the ends of said fitting and having an aperture therethrough, a ridge formed around the upper surface of said partition and having a recess across the same, a flexible diaphragm lying on said partition within said ridge and having a lip extending into said recess, a washer mounted on said ridge and overlapping said diaphragm, an air compressing device mounted on the upper end of said fitting and exerting pressure on said washer, said fitting having a discharge port through its wall to a point adjacent to said lip.

2. An atomizer comprising a tubular fitting, a partition between the ends of said fitting and having an aperture therethrough, a ridge formed around the upper surface of said partition and having a recess across the same, a flexible diaphragm lying on said partition within said ridge and having a lip extending into said recess, a washer mounted on said ridge loosely in said fitting and leaving a portion of said lip exposed, said washer overlapping said diaphragm, an air compressing device mounted on the upper end of said fitting and exerting pressure on said washer, said fitting having a discharge port through its wall to a point adjacent to said lip.

3. An atomizer comprising a tubular fitting, a partition between the ends of said fitting and having an aperture therethrough, a ridge formed around the upper surface of said partition and having a recess across the same, a flexible diaphragm lying on said partition within said ridge and having a lip extending into said recess, a washer mounted on said ridge and overlapping said diaphragm, an air compressing device mounted on the upper end of said fitting and exerting pressure on said washer, said fitting having a discharge port through its wall to a point adjacent to said lip, and means for venting said fitting below said partition.

4. An atomizer comprising a tubular fitting, a partition between the ends of said fitting and having an aperture therethrough, a ridge formed around the upper surface of said partition and having a recess across the same, a flexible diaphragm lying on said partition within said ridge and having a lip extending into said recess, said diaphragm being thinner than said ridge, a washer mounted on said ridge and overlapping said diaphragm, an air compressing device mounted on the upper end of said fitting and exerting pressure on said washer, said fitting having a discharge port through its wall to a point adjacent to said lip.

5. An atomizer comprising a tubular fitting, a partition between the ends of said fitting and having an aperture therethrough, a ridge formed around the upper surface of said partition and having a recess across the same, a flexible diaphragm lying on said partition within said ridge and having a lip extending into said recess, said diaphragm being thinner than said ridge, a washer mounted on said ridge and overlapping said diaphragm, an air compressing device mounted on the upper end of said fitting and exerting pressure on said washer, said fitting having a discharge port through its wall to a point adjacent to said lip, and means for venting said fitting below said partition.

6. An atomizer comprising a tubular fitting, a partition between the ends of said fitting and having an aperture therethrough, a ridge formed around the upper surfaces of said partition and having a recess across the same, a flexible diaphragm lying on said partition within said ridge and having a lip extending into said recess, a washer mounted on said ridge and overlapping said diaphragm, a compressible cap inserted in the upper end of said fitting and bearing on said washer, said fitting having a discharge port through its wall to a point adjacent to said lip, and means for venting said fitting below said partition.

7. An atomizer comprising a tubular fitting, a partition between the ends of said fitting and having an aperture therethrough, a ridge formed around the upper surfaces of said partition and having a recess across the same, a flexible diaphragm lying on said partition within said ridge and having a lip extending into said recess, said diaphragm being thinner than said ridge, a washer mounted on said ridge and overlapping said diaphragm, a compressible cap inserted in the upper end of said fitting and bearing on said washer, said fitting having a discharge port through its wall to a point adjacent to said lip, and means for venting said fitting below said partition.

8. An atomizer comprising a tubular fitting, a partition between the ends of said fitting and having an aperture therethrough, a ridge formed around the upper surface of said partition and having a recess across the same, a flexible diaphragm lying on said partition within said ridge and having a lip extending into said recess, said diaphragm being thinner than said ridge, a washer mounted on said ridge loosely in said fitting and leaving a portion of said lip exposed, said washer overlapping said diaphragm, an air compressing device mounted on the upper end of said fitting and exerting pressure on said washer, said fitting having a discharge port through its wall to a point adjacent to said lip.

References Cited in the file of this patent
UNITED STATES PATENTS

| | | |
|---|---|---|
| 2,427,912 | Killorin | Sept. 23, 1947 |
| 2,465,274 | Rudd | Mar. 22, 1949 |